April 19, 1938. L. A. BABIN 2,114,697
BROILER
Filed Aug. 14, 1935 2 Sheets-Sheet 1

Louis A. Babin, INVENTOR
BY Victor J. Evans & Co.
ATTORNEY

April 19, 1938.　　　　L. A. BABIN　　　　2,114,697
BROILER
Filed Aug. 14, 1935　　　2 Sheets-Sheet 2
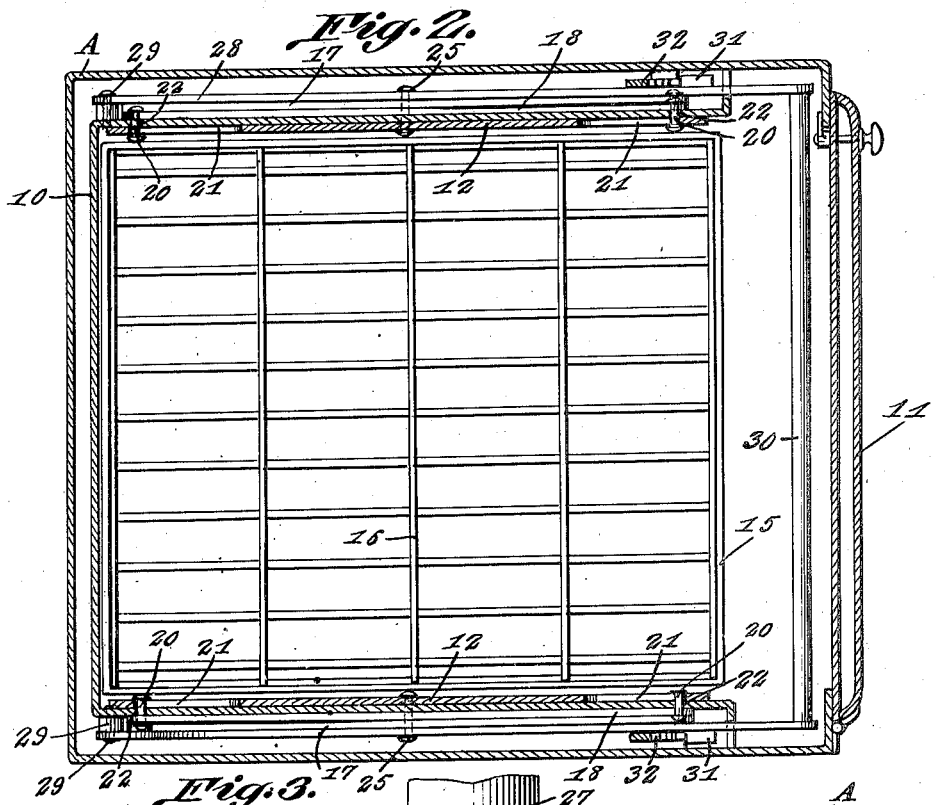
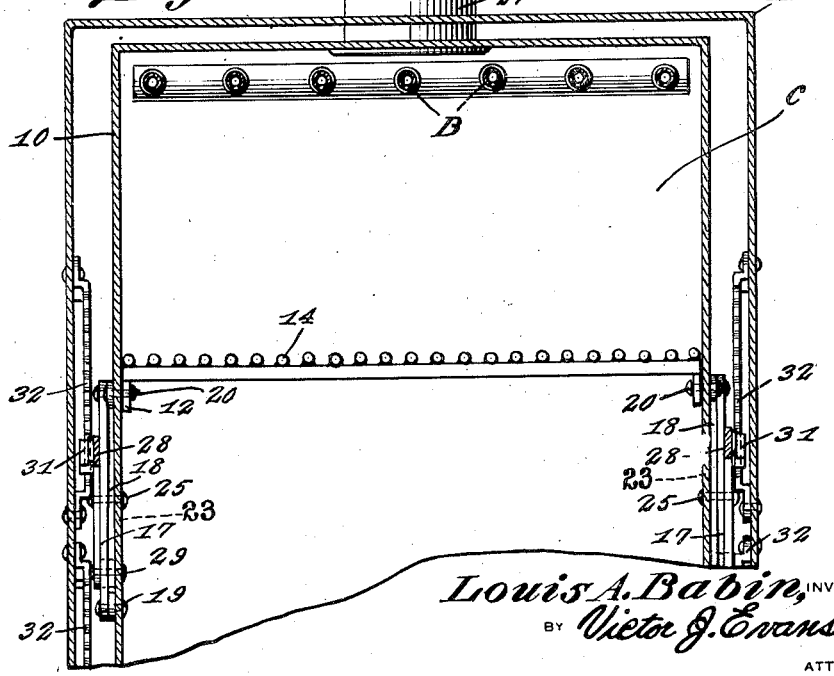
Louis A. Babin, INVENTOR
BY Victor J. Evans & Co.
ATTORNEY Patented Apr. 19, 1938

2,114,697

UNITED STATES PATENT OFFICE 2,114,697

BROILER

Louis Albert Babin, Dearborn, Mich.

Application August 14, 1935, Serial No. 36,218

9 Claims. (Cl. 126—337)

The invention relates to a broiler and more especially to an adjustable broiler.

The primary object of the invention is the provision of a broiler of this character, wherein the grill or the support for the article to be broiled can be raised and lowered within a heat chamber of a stove so as to bring the substance to be cooked nearer to or away from the fire at one side thereof and such substance is subjected to heat both above and below the said substance and in this manner all surfaces are cooked at the same time whereby the pores on the surfaces are quickly sealed and all juices held within with the result that the flavor of such substances is improved and a much better appearance had than if opposite sides were cooked at different times, the cooking period being reduced to a minimum.

Another object of the invention is the provision of a broiler of this character, wherein the necessity for the turning over of meat or other food substances to be broiled will be entirely eliminated and the cooking thereof is had evenly at both sides and in this manner eliminating the loss of juices and substantially the dissipation of fat therefrom, the juices being sealed within and shrinkage reduced to a minimum due to the short cooking period had by cooking both sides of the substance at one and the same time.

A further object of the invention is the provision of a broiler of this character, wherein through adjustment thereof the heating of the substance can be regulated with the result that the cooking period can be speeded up or lengthened at the option of the user of the broiler, the latter being adaptable for use in electric, oil, gas or other stoves.

A still further object of the invention is the provision of a broiler of this character, which is comparatively simple in construction, thoroughly reliable and effective in its operation, manually controlled, adaptable for service in varying types of stoves, assuring economy in the consumption of fuel, enabling the shortening of the cooking period and inexpensive to manufacture and install.

With these and other objects in view the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 2 is a sectional view on the line 2—2 of Figure 1 looking in the direction of the arrows.

Figure 3 is a fragmentary sectional view on the line 3—3 of Figure 1 looking in the direction of the arrows.

Similar reference characters indicate corresponding parts throughout the several views in the drawings.

Figure 1:
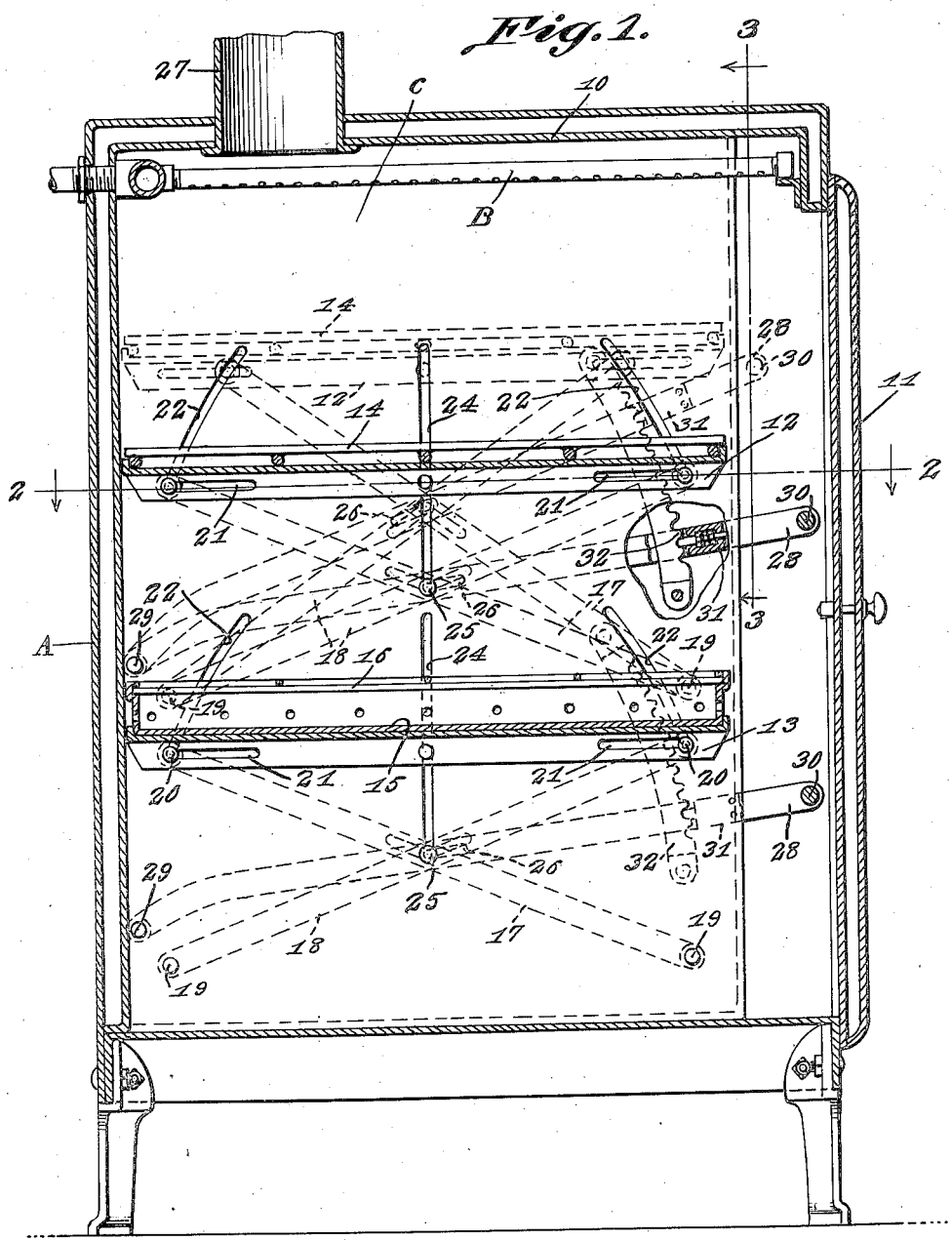
Figure 1 is a vertical sectional view through a stove showing the broiler constructed in accordance with the invention applied thereto, the article or substance support or grill being shown by full lines in one position and by dotted lines in another position.

Referring to the drawings in detail, A designates a portion of a stove or range body, in this instance of the gas heating type, and B is its burner located at the top of the heating compartment or chamber C. This stove or range A has built into the same a lining 10 creating the heating compartment or chamber C and such lining is spaced from the sides, back and top of the outer casing of the said stove or range, access being had to the compartment or chamber C at its front by a door 11 for the stove or range.

Located within the compartment or chamber C is the broiler constituting the present invention which comprises opposite pairs of upper and lower raising racks 12 and 13, respectively, and carried by the racks 12 is a removable grill or support 14 for meat or other food substance to be broiled while removably carried by the racks 13 is a charcoal pan 15 for the burning of charcoal therein, the said pan being provided with a lattice guard or cover 16. The grill or support 14, pan 15 and guard or cover 16 are of conventional kind.

The pairs of racks 12 and 13 are supported and raised and lowered through the use of lazy tong arranged arms 17 and 18, respectively, these being disposed in crossed relation to each other and are located at opposite sides of the stove or range A between the lining 10 and the outer casing or shell thereof. The arms 17 and 18 swing upon pivots 19 suitably built within the stove or range and have pivotal connection at 20 with the racks 12 and 13, these connections play in slots 21 in the racks and in slots 22 in the lining 10 for the raising and lowering movements of said racks while at the crossing points of the arms 17 and 18 are links 23, these working in vertically disposed guide slots 24 formed in said lining 10 and have pivotal connection at 25 with said arms 17 and 18, the latter being provided with the slots 26 for the pivotal connections 25 of the links 23 therewith to allow for the angular change of position of the said arms on the raising and lowering of the racks.

The racks 12 under adjustment thereof bring the grill or support 14 closer to or away from the burner B which heats the upper side of the meat or substance upon said grill or support for broiling purposes, while the racks 13 bring the pan 15 closer to or away from the grill or support 14 and the charcoal fire when burning within the pan heats the under side of the meat or other substance thereon for broiling purposes.

The stove or range A at its top has the outlet vent 27 as usual.

Fitted between the range or stove outer casing or shell and the lining 10 at opposite sides thereof are the actuator levers 28, there being a pair for the upper racks 12 and a pair for the lower racks 13 and each pair swings upon pivots 29 and are joined by a handle bar 30 at the front or forward ends thereof, this bar 30 being extended forwardly with relation to the racks 12 and 13 for convenient reach by an operator at the open front of the chamber C so that they can be manually manipulated for the swinging of the pairs of levers 28 which are engaged with the pivotal portions of the links 23, these being engaged with the racks 12 and 13 at the location of the slots 24 and on movement of the actuator levers the racks 12 and 13 can be raised and lowered.

The levers carry spring tensioned ratchet acting latches 31 engageable with toothed keeper sectors 32 fixed in the stove or range A between the outer casing or shell thereof and the lining 10 at the required location so that said levers 28 can be latched in adjusted position, the latches 31 being adapted to ratchet over the keeper sectors 32 on the shifting of the said levers 28 for adjustment of the racks 12 and 13.

It should be apparent from Figure 1 of the drawings that the grill or support 14 can be adjusted with relation to the burner B for the heating of the upper side of the meat or other substance upon the grill or support while the pan 15 can be adjusted with relation to the grill or support 14 for the heating of the lower side of the meat or food substance thereon so that at one and the same time the meat or food substance can be broiled on both sides thereof and by this adjustment the heating or broiling period can be speeded up or lengthened at the option of the user of the broiler.

The arms 17 and 18 and the links 23 under adjustment of the racks 12 and 13 will sustain the latter level.

What is claimed is:

1. In a broiler provided with wall portions defining a cooking compartment together with a pair of compartments oppositely disposed about said cooking compartment, the combination of a rack adjustably mounted in said cooking compartment, a pan member mounted on said rack and adapted to contain charcoal or similar fuel, a guard member mounted on said rack and extending over said charcoal or similar fuel, a pair of lever members in each of said pair of compartments oppositely disposed about said rack in said cooking compartment, said pair of lever members being pivotally mounted on said wall portions of said cooking compartment, pivot means connecting said pair of lever members with said racks, said pivot means extending through said wall portions of said cooking compartment, a handle lever in each of said compartments oppositely disposed about said rack in said cooking compartment and pivotally mounted on said wall portions of said cooking compartment, a second pivot means connecting said handle lever with said pair of lever members connected with said rack member, said second pivot means extending through said wall portions of said cooking compartment, a handle bar connecting said handle levers for said rack, said handle bar being located at the front of said cooking compartment, a ratchet member movably mounted on said handle lever, and a sector member mounted on a wall portion of the broiler and provided with teeth portions for engaging said ratchet member to permit said rack to be maintained in adjusted positions in said cooking compartment.

2. In a broiler mechanism provided with a cooking compartment together with a pair of compartments oppositely disposed about said cooking compartment, the combination of a rack in said cooking compartment and comprising angle members adjacent opposite side walls of said cooking compartment, a grill support having a frame member removably supported on said angle members and provided with rod members extending between sides of said frame member, said rod members being adapted to support a substance to be cooked, leverage mechanism mounted in each of said oppositely disposed compartments and connected with said racks to adjustably support said racks together with said grill support and said substance, and a pan member mounted in said cooking compartment below said grill support and adapted to support charcoal or similar fuel.

3. In a broiler mechanism provided with a cooking compartment together with compartments at each of its vertical sides, the combination of a pair of racks in said cooking compartment and comprising angle members adjacent opposite side walls of said cooking compartment, a grill support having a frame member movably supported on said angle members and provided with rod members extending between sides of said frame member, said rod members being adapted to support a substance to be broiled, leverage mechanism mounted in said compartments at each of the vertical sides of said cooking compartment and connected with said racks to adjustably support said racks together with said grill support and said substance, a pair of racks below said grill support in said cooking compartment and comprising angle members adjacent opposite side walls of said cooking compartment, a pan member mounted on said last mentioned angle members and adapted to contain charcoal or similar fuel to broil said substance, and a second leverage mechanism mounted in said compartments at each of the vertical sides of said cooking compartment and connected with and adapted to adjustably support said second racks together with said pan member and said charcoal or similar fuel.

4. In a broiler mechanism, the combination of a housing provided with a cooking compartment having wall portions spaced from the sides of said housing to form chambers therebetween, a grill member mounted in said cooking compartment, said grill member being adapted to support a substance to be broiled, a pan member for containing charcoal or similar fuel and mounted in said cooking compartment below said grill member, and a pair of leverage mechanisms connected with said grill member and said pan member and forming adjustable supports therefor, said pair of leverage mechanisms being housed in said chambers between said wall portions of said cooking compartment and said housing, said pair of leverage mechanisms extending out of said chambers, adjacent the front side of said cooking compartment, to provide handle said portions to permit manual operation thereof.

5. In a broiler mechanism, the combination of a housing provided with a cooking compartment having an open side, said housing being provided with chambers extending between oppositely disposed side walls of said cooking compartment and oppositely disposed side walls of said housing, each of said chambers being closed at their sides adjacent said open side of said cooking compartment, a door supported by said housing and adapted to close said open side of said housing, a grill member mounted in said cooking compartment and adapted to support a substance while being broiled, a pair of leverage mechanisms mounted in each of said chambers between said side walls of said cooking compartment and said housing, each of said leverage mechanisms being provided with lever members extending through said closed sides of said chambers adjacent the open side of said cooking compartment, one of each of said pair of leverage mechanisms being operatively connected with and adapted to adjustably support one of said pair of burner means, the other of each of said pair of leverage mechanisms being operatively connected with and adapted to adjustably support said grill member together with said substance, and handle members connecting said lever members and extending through said closed sides of said chambers, said handle members extending between said open side of said cooking compartment and said door when in its closed position.

6. In a broiler mechanism, the combination of a housing provided with a cooking compartment together with a pair of closed chambers at opposite sides thereof, a pair of arm members pivotally supported in each of said closed chambers and operatively connected together, a second pair of arm members pivotally supported in each of said closed chambers and operatively connected together, a burner means mounted in said cooking compartment, a grill member in said cooking compartment below said burner means, said grill member being supported by said first mentioned pair of arm members, said grill member being adapted to support a substance being broiled, a second burner means in said cooking compartment below said grill member, said first mentioned and said second burner means cooperating to equally broil said substance from opposite sides, said second burner means being supported by said second pair of arm members, and a lever member pivotally supported in each of said closed chambers and extending through front wall portions thereof and operatively connected with each of said pair of arm members, and handle members connecting said lever members and extending adjacent one side of said cooking compartment.

7. In a broiler mechanism, the combination of a housing provided with a cooking compartment having oppositely disposed wall portions provided with radial slots therethrough, said housing being further provided with closed chambers adjacent each of said oppositely disposed wall portions, a plurality of pairs of arm members pivotally mounted in each of said closed chambers, a burner means mounted in said cooking compartment, a grill member in said cooking compartment below said burner means and adapted to support a substance being broiled, pivot means connecting with and supporting said grill member, said pivot means extending through said radial slots to connect with a portion of said plurality of pairs of arm members, a second burner means in said cooking compartment below said grill member, a second pivot means connecting with and supporting said second burner means, said second pivot means extending through said radial slots to connect with a portion of said plurality of pairs of arm members, and handle lever members pivotally supported in each of said closed chambers and operatively connected with said plurality of pairs of arm members, said handle lever members extending out of said closed chambers to permit access therewith for manual operation thereof.

8. In a broiler mechanism, the combination of a housing provided with a cooking compartment having oppositely disposed wall portions provided with slots therethrough, together with closed chambers adjacent each of said oppositely disposed wall portions, a burner means mounted in said cooking compartment, a plurality of racks in said cooking compartment adjacent said oppositely disposed wall portions and provided with slots therethrough, a grill member in said cooking compartment and supported by a portion of said plurality of racks below said burner means, said grill member being adapted to support a substance to be broiled, a second burner means in said cooking compartment and supported by a portion of said racks below said grill member, said first mentioned and said second burner means cooperating to broil said substance equally from opposite sides, a plurality of pairs of arm members pivotally mounted in each of said closed chambers, pivot means connecting said racks and said pairs of arm members to adjustably support said grill member and said second burner means respectively, said pivot means engaging said slots of said oppositely disposed wall portions and said racks, and lever handles pivotally mounted in each of said closed chambers and operatively connected with said pairs of arm members, said lever handles extending out of said closed chambers to permit manual operation thereof.

9. In a broiler mechanism, the combination of a housing provided with a cooking compartment having oppositely disposed wall portions provided with slots therethrough, said housing being further provided with closed chambers adjacent each of said oppositely disposed wall portions, a burner means mounted in said cooking compartment of said housing, a plurality of racks in said cooking compartment adjacent said oppositely disposed wall portions and provided with slots therethrough, a grill member in said cooking compartment and supported by a portion of said plurality of racks below said burner means, said grill member being adapted to support a substance to be broiled, a second burner means in said cooking compartment and supported by a portion of said racks below said grill member, said first mentioned and said second burner means cooperating to broil said substance equally from opposite sides, a plurality of pairs of arm members pivotally mounted in each of said closed chambers, pivot means connecting said racks and said pairs of arm members to adjustably support said grill member and said second burner means respectively, said pivot means engaging said slots of said oppositely disposed wall portions and said racks, lever handles pivotally mounted in each of said closed chambers and operatively connected with said pairs of arm members, said lever handles extending out of said closed chambers to permit manual operation thereof, latch members movably mounted on said lever handles in said closed chambers, and sector members mounted in said closed chambers and provided with teeth portions for engaging said latch members for retaining said lever handles together with their operatively connected mechanism in selected positions for positioning said grill member and said second burner means in adjusted positions in said cooking compartment.

LOUIS A. BABIN.